United States Patent
Han et al.

(10) Patent No.: US 7,723,924 B2
(45) Date of Patent: May 25, 2010

(54) BACKLIGHT INVERTER AND LIQUID CRYSTAL DISPLAY USING THE SAME

(75) Inventors: Song-Yi Han, Yongin-si (KR); Min-Soo Choi, Cheonan-si (KR); Jin-Taek Hong, Incheon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 25 days.

(21) Appl. No.: 12/058,952

(22) Filed: Mar. 31, 2008

(65) Prior Publication Data
US 2008/0258645 A1    Oct. 23, 2008

(30) Foreign Application Priority Data
Mar. 29, 2007    (KR) ............ 10-2007-0030821

(51) Int. Cl.
H05B 37/02    (2006.01)
(52) U.S. Cl. .............. 315/224; 315/274; 315/307; 315/308; 315/DIG. 5
(58) Field of Classification Search .......... 315/224, 315/307, 308, 312, 313, 274, 275, 276, 277, 315/DIG. 5, DIG. 7
See application file for complete search history.

(56) References Cited

U.S. PATENT DOCUMENTS 5,977,725 A * 11/1999 Miyazaki et al. .......... 315/291
7,208,882 B2 * 4/2007 Ishizuka .................... 315/225
7,436,130 B2 * 10/2008 Komatsu et al. ........... 315/307

FOREIGN PATENT DOCUMENTS

| JP | 2002-151287 | 5/2002 |
|----|---|---|
| KR | 1020040009103 A | 1/2004 |
| KR | 1020050116084 A | 12/2005 |

* cited by examiner

Primary Examiner—David Hung Vu
(74) Attorney, Agent, or Firm—F. Chau & Associates, LLC (57) ABSTRACT

A backlight inverter includes a transformer boosting an input voltage at a ratio of a primary winding to a secondary winding of the transformer and outputting a first voltage and a second voltage; a protection level signal generator causing a phase delay between the first voltage and the second voltage, and generating a protection level signal, the protection level signal being a sum of the phase reversed first voltage and the second voltage; and an arc state detector comparing the protection level signal with a reference voltage and generating a detection signal; and a diving controller maintaining or stopping a supplying of an input voltage to the transformer in response to the detection signal, wherein in addition to the phase delay, another phase delay is caused by an open circuit in the transformer, so that a maximum value of the protection level signal is larger than the reference voltage and the input voltage is stopped.

20 Claims, 5 Drawing Sheets

BACKLIGHT INVERTER AND LIQUID CRYSTAL DISPLAY USING THE SAME

CROSS-REFERENCE TO RELATED PATENT APPLICATION

This application claims priority to Korean Patent Application No. 2007-0030821, filed Mar. 29, 2007, the contents of which are herein incorporated by reference in their entirety.

BACKGROUND OF THE INVENTION

1. Technical Field

The present disclosure is directed to a backlight inverter and, more particularly, to a backlight inverter for a liquid crystal display device.

2. Discussion of Related Art

A liquid crystal display ("LCD") device includes a thin-film transistor substrate, a color filter substrate facing the thin-film transistor substrate, and a liquid crystal layer between the thin-film transistor substrate and color filter substrate. The LCD device displays an image by applying an electric field to electrodes of the substrates to cause the liquid crystal to flow in the liquid crystal layer.

The liquid crystal layer does not emit light by itself and only adjusts the transmittance of incident light to display an image. Accordingly, the LCD device requires a backlight device to emit light sufficient to view an image.

The backlight device includes a plurality of fluorescent lamps and a backlight inverter for driving the fluorescent lamps. The backlight inverter converts a low direct current (DC) voltage into an alternating current (AC) voltage, boosts it using a transformer, and then supplies it to the fluorescent lamps in order to drive the fluorescent lamps.

The backlight inverter outputs a high level voltage to drive the fluorescent lamps and, therefore, requires a protection circuit to prevent the backlight inverter from operating in an abnormal driving state, such as the occurrence of electrical arcs, or open and short circuits.

An electrical arc created in the backlight inverter may burn out the transformer, which may result in a fire. The occurrence of an electrical arc may be difficult to detect because a current may flow in the backlight inverter even though the backlight inverter has an open circuit.

SUMMARY OF THE INVENTION

An exemplary embodiment of the present invention provides a backlight inverter that is capable of detecting the occurrence of an electrical arc by causing a phase delay between two output voltages from a transformer, and a LCD device using the backlight inverter.

According to an exemplary embodiment of the present invention, a backlight inverter comprises: a transformer boosting an input voltage at a ratio of a primary winding to a secondary winding of the transformer and outputting it as a first voltage and a second voltage; a protection level signal generator causing a phase delay between the first voltage and the second voltage, and generating a protection level signal, the protection level signal being a sum of the phase reversed first voltage and the second voltage; and an arc state detector comparing the protection level signal with a reference voltage and generating a detection signal; and a driving controller keeping or stopping the supplying of an input voltage to the transformer in response to the detection signal, wherein in addition to the phase delay, another phase delay occurs caused by an open circuit in the transformer, so that a maximum value of the protection level signal is larger than the reference voltage.

A phase of the first voltage may be the reverse of a phase of the second voltage.

The protection level signal generator may comprise a first capacitor receiving the first voltage; a second capacitor receiving the second voltage; a third capacitor connected between the first capacitor and a ground to form a detection point where the protection level signal is output; and a delay line connected between the first capacitor and the second capacitor to cause a phase delay between the first voltage and the second voltage.

The delay line may be wired in a zig-zag manner, so that the length of the delay line may be adjusted.

The arc state detector may comprise a reference voltage generater generating the reference voltage from a voltage of a power supply, and a comparator generating the detection signal in response to the reference voltage and the protection level signal.

The comparator can enable the detection signal when the protection level signal is larger than the reference voltage, and can disable the detection signal when the protection level signal is smaller than the reference voltage.

The arc state detector may further comprise a protection level signal receiver, the protection level signal receiver rectifying the protection level signal and supplying it to the comparer.

According to an exemplary embodiment of the present invention, a LCD device comprises: a voltage convertion portion generating a common voltage, a gamma voltage, and gate-on and gate-off voltages using an input direct current voltage; a display panel portion displaying data using the common voltage, the gamma voltage, and the gate-on and gate-off voltage; an inverter boosting and converting the input direct current voltage into a first voltage and a second voltage having a phase that is a reverse of a phase of the first voltage, causing a phase delay between the first voltage and the second voltage, generating a protection level signal, the protection level signal being a sum of the phase reversed first voltage and the second voltage, comparing the protection level signal with a reference voltage and generating a detection signal, and keeping or stopping the supplying of an input signal depending on a result of the comparison; and a lamp portion illuminating light on the display panel portion in response to the first voltage and the second voltage, wherein in addition to the phase delay, another phase delay occurs by an open circuit in the inverter, so that a maximum value of the protection level signal is larger than the reference voltage.

BRIEF DESCRIPTION OF THE DRAWINGS

Exemplary embodiments of the present invention will be understood in more detail from the following descriptions taken in conjunction with the accompanying drawings, in which exemplary embodiments of the present invention are shown. This invention may, however, be embodied in many different forms and should not be construed as limited to the exemplary embodiments set for the herein.

DESCRIPTION OF EXEMPLARY EMBODIMENTS

Figure 1:
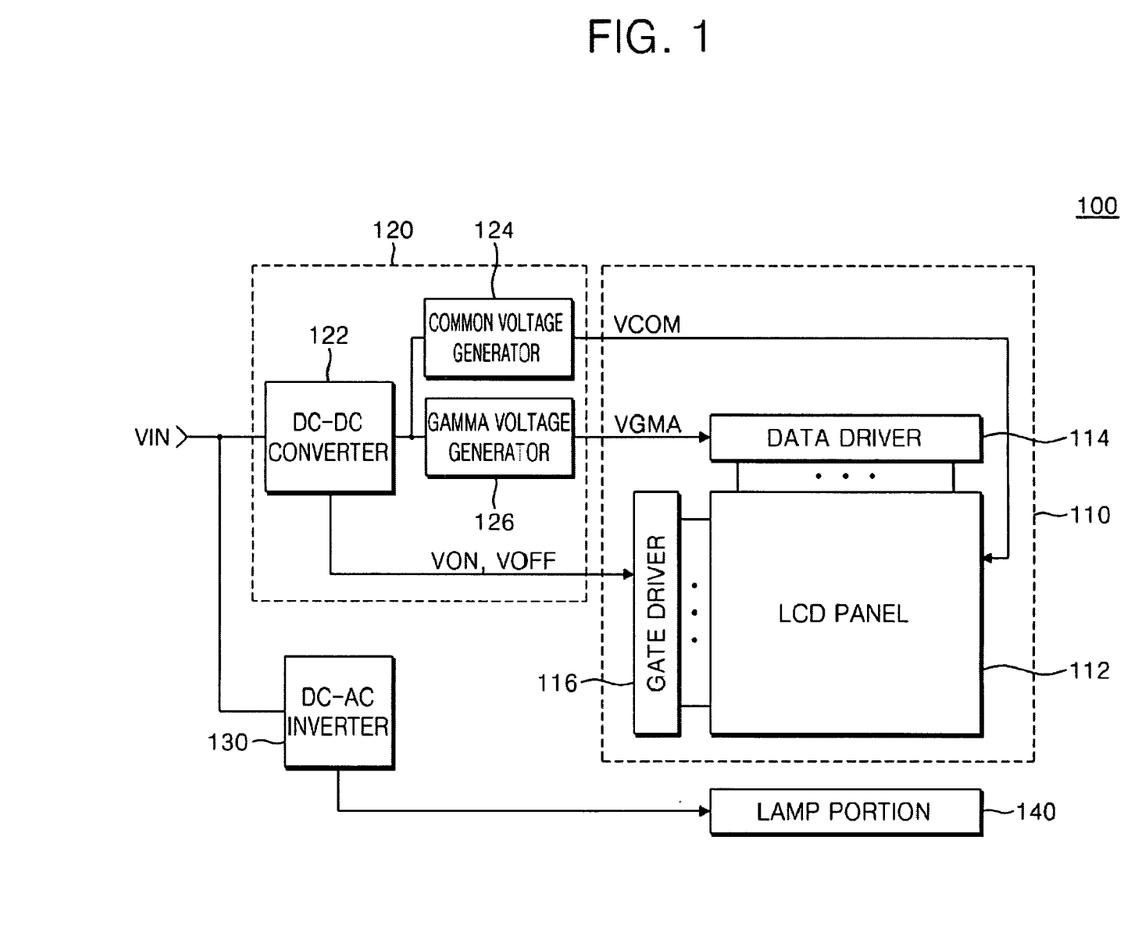
FIG. 1 is a block diagram of an LCD device according to an exemplary embodiment of the present invention.

FIG. 1 is a block diagram of an LCD device according to an exemplary embodiment of the present invention. Referring to FIG. 1, an LCD device 100 includes a display panel portion 110, a DC (Direct Current)-DC (Direct Current) voltage conversion portion 120, a DC (Direct Current)-AC (Alternating Current) inverter 130, and a lamp portion 140.

The display panel portion 110 includes a data driver 114, a gate driver 116, and an LCD panel 112. The data driver 114 supplies the LCD panel 112 with a gray level display voltage corresponding to a data gray level using a gamma voltage VGMA from the DC-DC voltage conversion portion 120. The gate driver 116 supplies gate-on and gate-off voltages VON and VOFF, respectively, from the DC-DC voltage conversion portion 120 to the LCD panel 112.

The LCD panel 112 supplies liquid cells with the gray level display voltage from the data driver 114 and a common voltage VCOM from the DC-DC voltage conversion portion 120 in response to the gate-on and gate-off voltages VON and VOFF, respectively, from the gate driver 116.

The DC-DC voltage conversion portion 120 includes a DC-DC converter 122, a common voltage generator 124, and a gamma voltage generator 126. The DC-DC converter 122 converts the level of an externally supplied DC voltage VIN, and supplies it to the common voltage generator 124 and gamma voltage generator 126. The common voltage generator 124 generates the common voltage VCOM using a DC voltage from the DC-DC converter 122, and supplies it to the display panel portion 110. The gamma voltage generator 126 generates a gamma voltage VGMA using a DC voltage from the DC-DC converter 122, and supplies it to the display panel portion 110.

The DC-AC inverter 130 converts the externally supplied DC voltage VIN into an alternating voltage, boosts it to a high level voltage using a transformer, and supplies it to the lamp portion 140 in order to drive the lamp portion 140.

The lamp portion 140 adjusts the amount of output light in response to the voltage from the DC-AC inverter 130, and illuminates the output light to the rear surface of the LCD panel 112.

Figure 2:
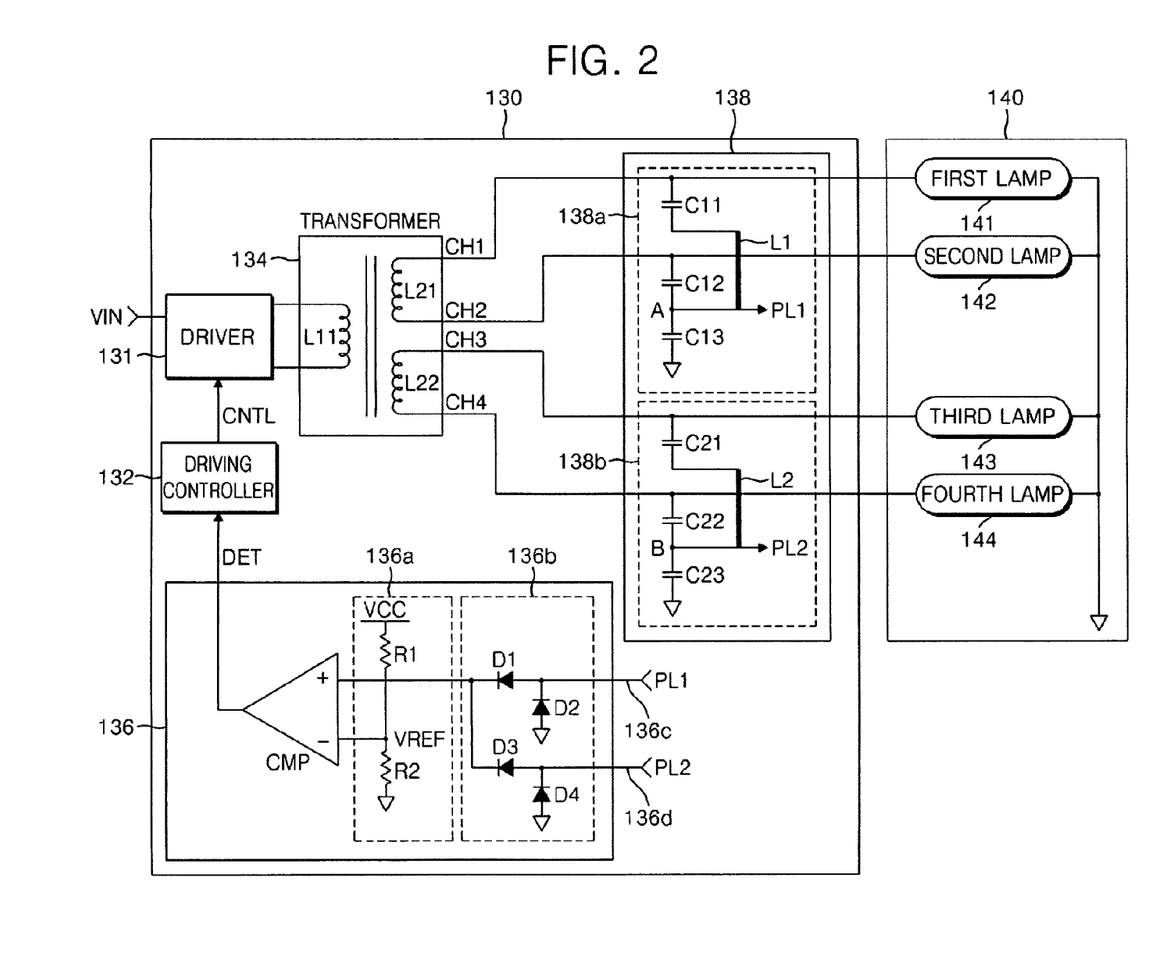
FIG. 2 is a circuit diagram of an exemplary embodiment of the inverter of FIG. 1.

FIG. 2 is a circuit diagram of an exemplary embodiment of the inverter shown in FIG. 1. Referring to FIG. 2, the inverter 130 includes a driver 131, a driving controller 132, a transformer 134, a protection level signal generator 138, and an arc state detector 136.

The driver 131 maintains or stops the supplying of the externally supplied voltage VIN, after having been converted to an alternating current voltage, to the transformer 134 in response to a control signal CNTL supplied from the driving controller 132. The driver 131 can include any well-known DC to AC inverter circuit (no shown).

The driving controller 132 generates the control signal CNTL in response to a detection signal DET supplied from the arc state detector 136 in order to control the driver 131. The driver 131 includes an inverter (not shown) and a switching means (not shown) for transmitting or not the externally supplied voltage VIN to the transformer 134 under control of the control signal CNTL generated in response to the detection signal DET fed to the driving controller 132. The switching means may include a transistor (not shown). The transistor (not shown) of the driver 131 may include a control terminal for receiving the control signal CNTL, an input terminal for receiving the externally supplied voltage signal VIN, and an output terminal connected to a primary winding L11 of the transformer 134.

The transformer 134 includes the primary winding L11 and secondary windings L21 and L22. The transformer 134 boosts a transformer driving voltage from the driver 131 in a ratio of the primary winding L11 and the secondary windings L21 and L22, and supplies the boosted voltage to the lamp portion 140. In the exemplary embodiment, the transformer 134 includes one primary winding L11 and two secondary windings L21 and L22, but the transformer is not limited thereto.

Output terminals CH1, CH2, CH3, and CH4 of the secondary windings L21 and L22 are connected to the lamps 141, 142, 143, and 144, respectively. The other terminals of the lamps 141, 142, 143, and 144, which are not connected to the transformer 134, are commonly connected to a ground.

The output terminals CH1 and CH2 of the secondary winding L21 supply a first alternating current (AC) voltage and a second alternating current (AC) voltage to the lamps 141 and 142, respectively, wherein a phase of the first alternating current voltage is the reverse of the phase of the second alternating current voltage. The output terminals CH3 and CH4 of the secondary winding L22 supply a first alternating current voltage and a second alternating current voltage to the lamps 143 and 144, respectively, wherein a phase of the first alternating voltage is the reverse of the phase of the second alternating voltage. A phase of the first alternating current voltage from the terminal CH1 is identical to the phase of the first alternating current voltage from the terminal CH3, and a phase of the second alternating current voltage from the terminal CH2 is identical to the phase of the second alternating current voltage from the terminal CH4.

The protection level signal generator 138, which is located between the lamp portion 140 and output terminals CH1, CH2, CH3, and CH4 of the transformer 134, generates a plurality of protection level signals PL1 and PL2, which indicate an occurrence of an electrical arc in the transformer 134, and supplies them to the arc state detector 136.

The protection level signal generator 138 includes a plurality of protection level signal generating units 138a and 138b. The protection level signal generating unit 138a includes, for example, a first capacitor C11, a second capacitor C12, a third capacitor C13, and a delay line L1.

One end of the first capacitor C11 is connected to the output terminal CH1, and one end of the second capacitor C12 is connected to the output terminal CH2. One end of the third capacitor C13 is connected to the other end of the second capacitor C12, and the other end of the third capacitor C13 is connected to a ground. A node connecting the second capacitor C12 and third capacitor C13 operates as a detection point A for the protection level generating unit 138a. The first protection level signal PL1 is taken from node A.

The delay line L1 connects the detection point A to the other end of the first capacitor C11. The delay line L1 causes a phase delay of an output voltage from the output terminal CH1. The phase delay may occur by increasing the resistance of the delay line L1, for example, by wiring the delay line in a zigzag manner so as to lengthen the delay line L1.

The phase delay may be performed so that a maximum value of an amplitude of a summed wave is smaller than a reference voltage VREF of the arc state detector 136. The summed wave is generated by adding amplitudes of the first and second voltages applied from the output terminals CH1 and CH2 to the detection point A.

The protection level signal generating unit 138b includes a first capacitor C21, a second capacitor C22, a third capacitor C23, and a delay line L2. The protection level signal generating unit 138b has the same construction as that of the protection level signal generating unit 138a and, therefore, the detailed description will be omitted. The second protection level signal PL2 is taken from a node B at the connection of the second capacitor C22 and the third capacitor C23.

The arc state detector 136 compares the reference voltage VREF with the protection level signals PL1 and PL2 from the protection level signal generator 138, and generates the detection signal DET to indicate the occurrence of an electrical arc.

The arc state detector 136 includes a protection level signal receiver 136b, a reference voltage generator 136a, and a comparator CMP. The protection level signal receiver 136b rectifies the protection level signals PL1 and PL2 from the protection level signal generator 138, performs an OR operation of the rectified protection level signals PL1 and PL2, and supplies the result of the OR operation to the non-inverting terminal (+) of the comparator CMP.

The protection level signal receiver 136b includes first diodes D1 and D3, which are located between the non-inverting terminal of the comparator CMP and the protection level signal input terminals 136c and 136d, respectively, and second diodes D2 and D4, which are located between ground and protection level signal input terminals 136c and 136d, respectively.

The reference voltage generator 136a supplies the reference voltage VREF to the inverting terminal (−) of the comparator CMP. The reference voltage generator 136a includes a plurality of resistors R1 and R2 that are connected in series between an input terminal of a power supply (not shown) and a ground. The reference voltage generator 136a splits a voltage VCC from the power supply (not shown) to generate the reference voltage VREF. The reference voltage VREF may be selected by adjusting the value of the resistors R1 and R2.

The comparator CMP compares the reference voltage VREF with the protection level signals PL1 and PL2, and generates the detection signal DET. For example, when one of the protection level signals PL1 and PL2 is larger than the reference voltage VREF, the comparator CMP enables the detection signal DET and supplies it to the driving controller 132.

When both protection level signals PL1 and PL2 are smaller than the reference voltage VREF, the comparator CMP disables the detection signal DET and supplies it to the driving controller 132. Enabling the detection signal DET indicates the occurrence of an electrical arc, and disabling the detection signal DET indicates the non-occurrence of an electrical arc.

Figure 3A:
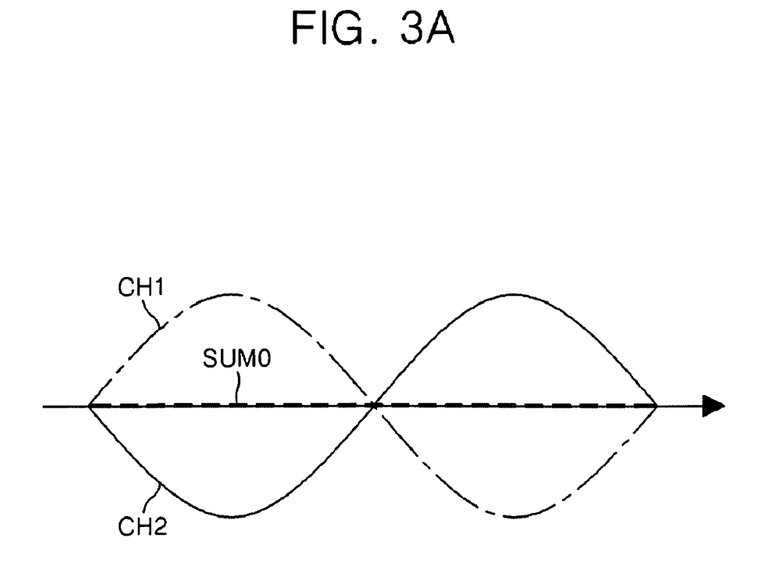
FIGS. 3A, 3B, and 3C are graphs for illustrating an operation of the inverter of FIG. 2.
Figure 3B:
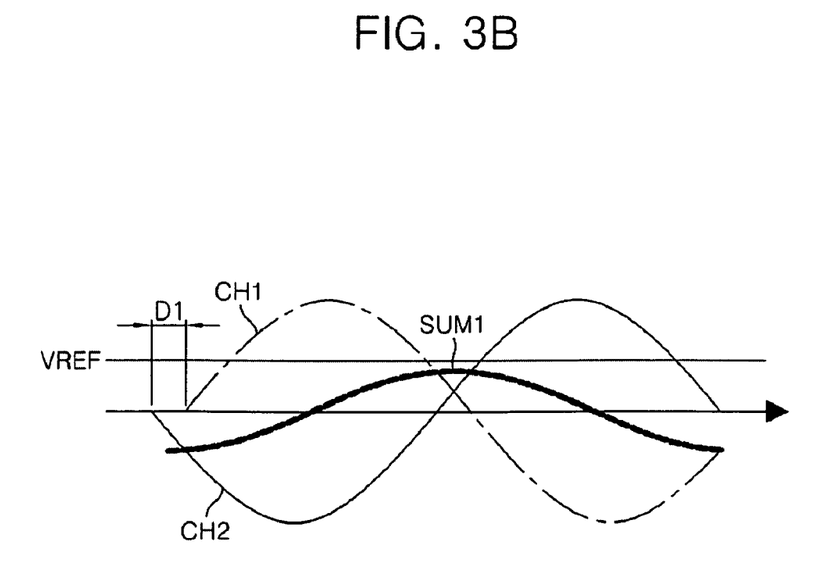
Figure 3C:
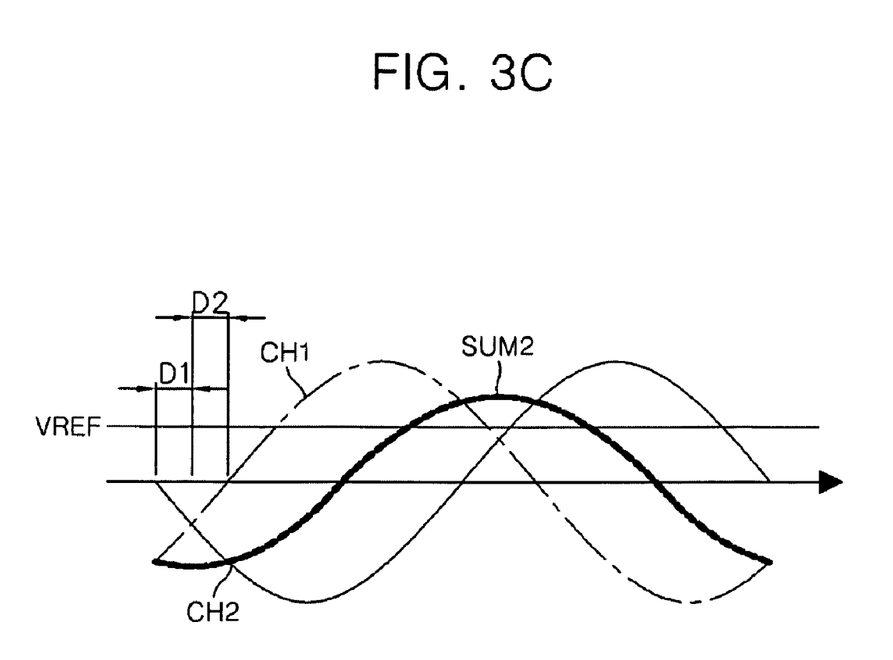

FIGS. 3A, 3B, and 3C are wavefroms for illustrating an operation of the inverter 130 of FIG. 2. FIG. 3A shows a waveform of a voltage output from the secondary windings, FIG. 3B shows a waveform of a voltage supplied to the detection point by the delay line, and FIG. 3C shows a waveform of a voltage supplied to the detection point during the occurrence of the electrical arc.

Referring to FIGS. 2 and 3A, one of the output terminals CH1 and CH2 of the secondary winding L21 outputs a first voltage and a second voltage, wherein a phase of the first voltage is the exact reverse of that of the second voltage. The first voltage is in a trade-off relation with the second voltage and, therefore, the amplitude of a summed wave SUM0 of the first and second voltages becomes '0'.

Referring to FIGS. 2 and 3B, a first voltage of the output terminal CH1 is delayed from a second voltage of the output terminal CH2 that is supplied to the detection point A by a prescribed distance D1 due to the delay line L1. The sum of the first voltage and the second voltage yields a summed wave SUM1 that has prescribed amplitude. The summed wave SUM1 is input to the arc state detector 136 as a protection level signal PL1. The maximum value of the summed wave SUM1 may be less than that of the reference voltage VREF used in the arc state detector 136.

Referring to FIGS. 2 and 3C, when an electrical arc is created by an open circuit in the inverter 130, the first voltage from the output terminal CH1 may be further delayed from the second output terminal CH2 by a prescribed distance D2. Accordingly, the amplitude of a summed wave SUM2 of the first voltage and the second voltage becomes larger than that of the summed wave SUM1. The summed wave SUM2 is input to the arc state detector 136 as a protection level signal PL1. The maximum value of the summed wave SUM2 may be larger than that of the reference voltage VREF used in the arc state detector 136.

The output terminals CH1 and CH2 of the secondary winding L21, which output phase-reversed first and second voltages, respectively, are connected to each other via the delay line L1, so that the first voltage from the output terminal CH1 may be delayed from the second voltage from the output terminal CH2, and the delayed first voltage may be further delayed from the second voltage due to the open circuit in the inverter 130.

The maximum value of the summed wave SUM1, which is a sum of the first voltage and the second voltage, is smaller than the reference voltage VREF when the first voltage is delayed from the second voltage only by the delay line L1, but the maximum value of the summed wave SUM2, which is a sum of the first voltage and the second voltage when the delayed first voltage by the delay line L1 is further delayed by the occurrence of an electrical arc, is larger than the reference voltage VREF. As a result, the inverter 130 may detect whether an electrical arc has occurred by comparing the reference voltage VREF with the protection level signals PL1 and PL2.

Figure 4:
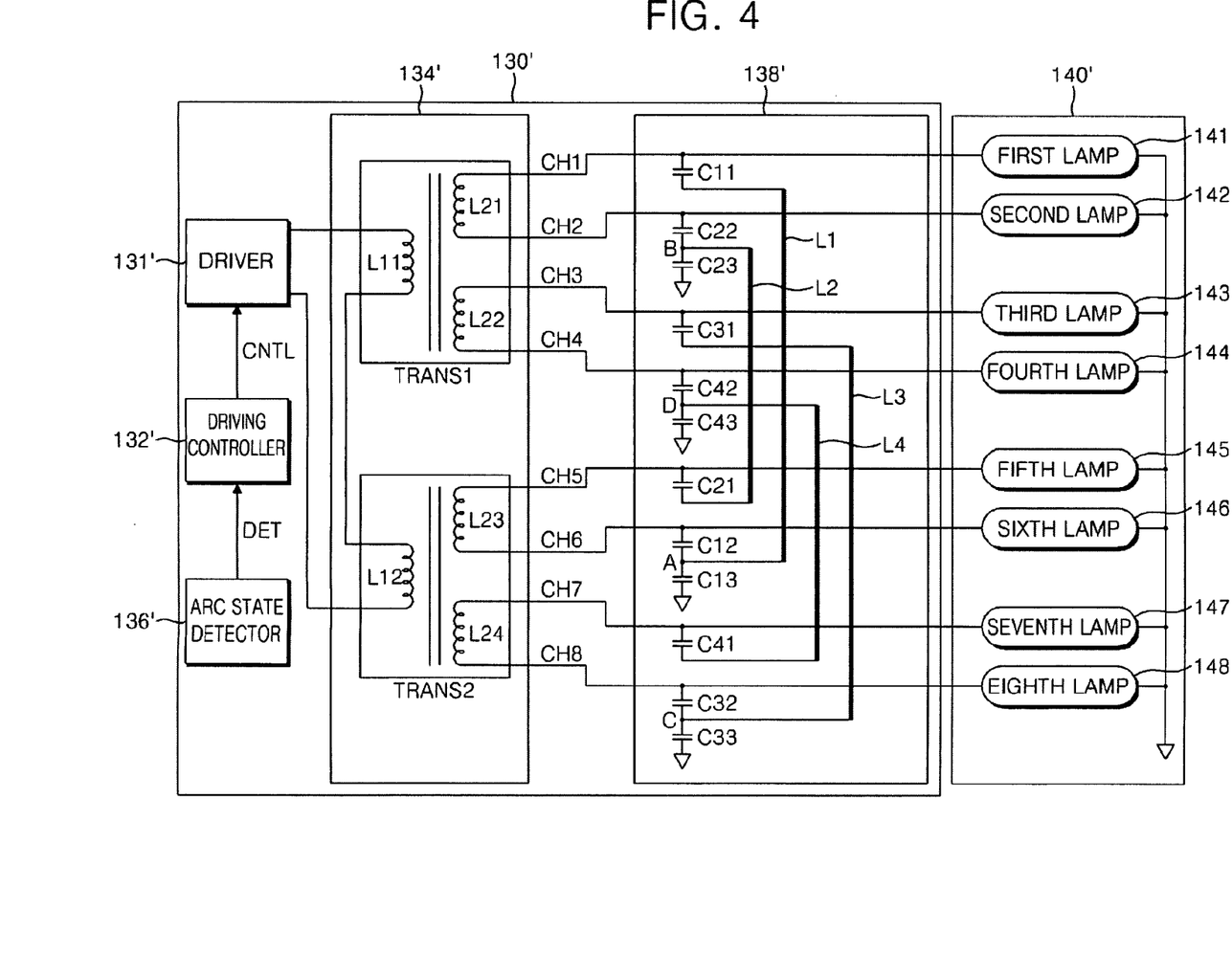
FIG. 4 is a circuit diagram of the inverter of FIG. 1 according to an exemplary embodiment of the present invention.

FIG. 4 is a circuit diagram of an inverter such as used in the system of FIG. 1 according to another exemplary embodiment of the present invention. Referring to FIG. 4, the DC-AC inverter 130' includes a transformer portion 134', a protection level signal generator 138' corresponding to the transformer portion 134', a driver 131', a driving controller 132', and an arc state detector 136'. The driver 131' receives the input voltage VIN (not shown) and inverts it to an alternating current voltage.

The transformer portion 134' includes two transformers TRANS1 and TRANS2. The first transformer TRANS1 includes a primary winding L11 and secondary windings L21 and L22, and the second transformer TRANS2 includes a primary winding L12 and secondary windings L23 and L24.

The output terminals CH1, CH2, CH3, CH4, CH5, CH6, CH7, and CH8 of the secondary windings L21, L22, L23, and L24 are connected to lamps 141, 142, 143, 144, 145, 146, 147, and 148, respectively of a lamp portion 140'.

The output terminals CH1 and CH2; CH3 and CH4; CH5 and CH6; and CH7 and CH8 of the secondary windings L21; L22; L23; and L24, respectively, supply a first alternating current (AC) voltage and a second alternating current (AC) voltage to the corresponding lamps 141 and 142; 143 and 144; 145 and 146; and 147 and 148, respectively, wherein a phase of the first alternating current voltage is the reverse of the phase of the second alternating current voltage.

The phases of the first voltages from the output terminals CH1, CH3, CH5, and CH7 are identical to one another, and the phases of the second voltages from the output terminals CH2, CH4, CH6, and CH8 are also identical to one another.

The protection level signal generator 138' includes four protection level signal generating units. The first protection level signal generating unit includes a capacitor C1, a capacitor C12, a capacitor C13, and a delay line L1. The capacitor C11 and capacitor C12 are connected to each other by the delay line L1. The second protection level signal generating unit includes a capacitor C21, a capacitor C22, a capacitor C23, and a delay line L2. The capacitor C21 and capacitor C22 are connected to each other by the delay line L2. The third protection level signal generating unit includes a capacitor C31, a capacitor C32, a capacitor C33, and a delay line L3. The capacitor C31 and capacitor C32 are connected to each other by the delay line L3. The fourth protection level signal generating unit includes a capacitor C41, a capacitor C42, a capacitor C43, and a delay line L4. The capacitor C41 and capacitor C42 are connected to each other by the delay line L4.

The four protection level signal generating units provide for protection level signals (not shown) that can be taken from nodes A, B, C, and D and fed to the arc state detector 136'. In the exemplary embodiment, the inverter 130' includes two transformers TRANS1 and TRANS2. The protection level signal generating unit of the inverter 130' includes a delay line, for example, L1, for connecting an output terminal, for example, CH1, of the transformer TRANS1 with an output terminal, for example, CH6, of the transformer TRANS2. The output terminal, for example, CH1, of the transformer TRANS1 outputs a first voltage, and the output terminal, for example, CH6, of the transformer TRANS2 outputs a second voltage, wherein a phase of the first voltage is the reverse of the phase of the second voltage. The delay time may be shaped depending on the distance between two output terminals, that is, the length. The first protection level signal (not shown) may be taken from the first node A and fed to the arc state detector 136'.

Other constructions and operations of the inverter 130' may be easily understood by those of ordinary skill in the art, and therefore, the detailed descriptions will be omitted.

Although two transformers TRANS1 and TRANS2 are included in the inverter 130' in the exemplary embodiment, the number of transformers is not limited thereto and more than three transformers may be employed.

The backlight inverter according to exemplary embodiments of the present invention can detect the occurrence of an electrical arc by causing a phase difference between two phase-reversed voltages from the transformer and, therefore, can prevent the inverter from being damaged.

Although exemplary embodiments of the present invention have been described herein with reference with the accompanying drawings, it is understood that the present invention is not be limited to these exemplary embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A backlight inverter comprising:
    a transformer boosting an input voltage at a ratio of a primary winding to a secondary winding of the transformer and outputting a first voltage and a second voltage; and
    a protection circuit which controls the input voltage to the transformer using a protection level signal generated by causing a predetermined phase delay on the first voltage and summing the phased-delayed first voltage and the second voltage.

2. The backlight inverter of claim 1, wherein the protection circuit comprises:
    a protection level signal generator generating the protection level signal by causing a predetermined phase delay on the first voltage and summing the phased-delayed first voltage and the second voltage;
    a state detector comparing the protection level signal with a reference voltage and generating a detection signal; and
    a driving controller maintaining or stopping supplying the input voltage to the transformer in response to the detection signal.

3. The backlight inverter of claim 2, wherein the protection level signal is no larger than the reference voltage in an ordinary operation.

4. The backlight inverter of claim 2, wherein the protection level signal generator comprises:
    a first capacitor receiving the first voltage;
    a second capacitor receiving the second voltage; and
    a delay line connected between the first capacitor and the second capacitor to cause a predetermined phase delay,
    wherein the protection level signal is output at a detection point located between the delay line and the second capacitor.

5. The backlight inverter of claim 4, wherein the protection level signal generator further comprises a third capacitor disposed between the detection point and a ground.

6. The backlight inverter of claim 4, wherein a length of the delay line is longer than a distance between the both ends of the delay line.

7. The backlight inverter of claim 6, wherein the delay line is wired in a zig-zag manner.

8. The backlight inverter of claim 2, wherein the state detector comprises,
    a reference voltage generator generating the reference voltage from a power-supply voltage, and
    a comparator generating the detection signal in response to comparing the protection level signal with the reference voltage.

9. The backlight inverter of claim 8, wherein the comparator enables the detection signal when the protection level signal is larger than the reference voltage.

10. The backlight inverter of claim 8, wherein the state detector further comprises a protection level signal receiver rectifying the protection level signal and supplying a rectified protection level signal to the comparator.

11. A method of driving a backlight inverter, comprising:
    boosting an input voltage to a first voltage and a second voltage by a transformer at a ratio of a primary winding and a secondary winding;
    generating a protection level signal by causing a predetermined phase delay on the first voltage and summing the phase-delayed first voltage and the second voltage; and
    controlling the input voltage according to a result of comparison of the protection level signal with a reference voltage.

12. A liquid crystal display device comprising:
    a voltage conversion portion generating a common voltage, a gamma voltage, and gate-on and gate-off voltages from an input direct current (DC) voltage;
    a display panel portion displaying data using the common voltage, the gamma voltage, and the gate-on and gate-off voltages;

an inverter boosting and converting the input DC voltage into a first alternating current (AC) voltage and a second AC, and using a protection level signal generated by causing a predetermined phase delay on the first voltage and summing the phased-delayed first voltage and the second voltage as a control signal thereof; and a lamp portion illuminating light on the display panel portion in response to the first AC voltage and the second AC voltage.

13. The liquid crystal display device of claim 12, wherein the protection circuit comprises:

a protection level signal generator generating the protection level signal by causing a predetermined phase delay on the first voltage and summing the phased-delayed first voltage and the second voltage;

a state detector comparing the protection level signal with a reference voltage and generating a detection signal; and a driving controller maintaining or stopping supplying the input voltage to the transformer in response to the detection signal.

14. The liquid crystal display device of claim 13, wherein the protection level signal generator comprises:

a first capacitor receiving the first voltage;

a second capacitor receiving the second voltage; and a delay line connected between the first capacitor and the second capacitor to cause a predetermined phase delay, wherein the protection level signal is output at a detection point located between the delay line and the second capacitor.

15. The liquid crystal display device of claim 13, wherein the protection level signal generator further comprises a third capacitor disposed between the detection point and a ground.

16. The liquid crystal display device of claim 13, wherein a length of the delay line is longer than a distance between the both ends of the delay line.

17. The liquid crystal display device of claim 16, wherein the delay line is wired in a zig-zag manner.

18. The liquid crystal display device of claim 13, wherein the state detector comprises, a reference voltage generator generating the reference voltage from a power-supply voltage, and a comparator generating the detection signal in response to comparing the protection level signal with respect to the reference voltage.

19. The liquid crystal display device of claim 18, wherein the comparator enables the detection signal when the protection level signal is larger than the reference voltage.

20. The liquid crystal display device of claim 18, wherein the state detector further comprises a protection level signal receiver rectifying the protection level signal and supplying a rectified protection level signal to the comparator.

* * * * *